Nov. 13, 1928.
G. W. BLACKBURN
1,691,107
ANTIGLARE DEVICE
Filed Nov. 7, 1927
5 Sheets-Sheet 1
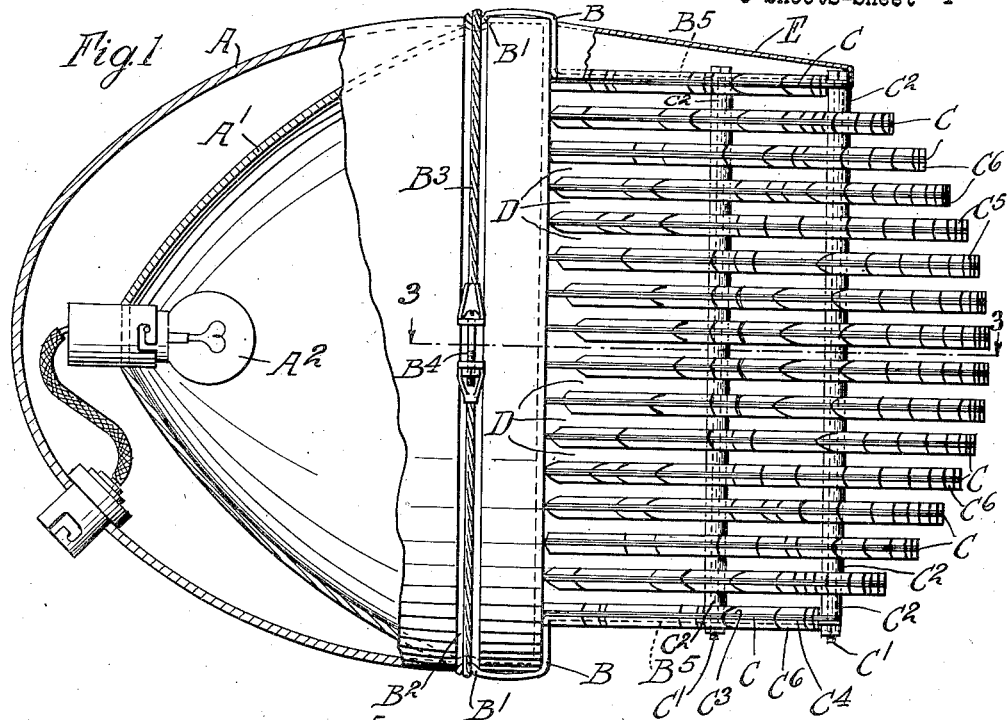
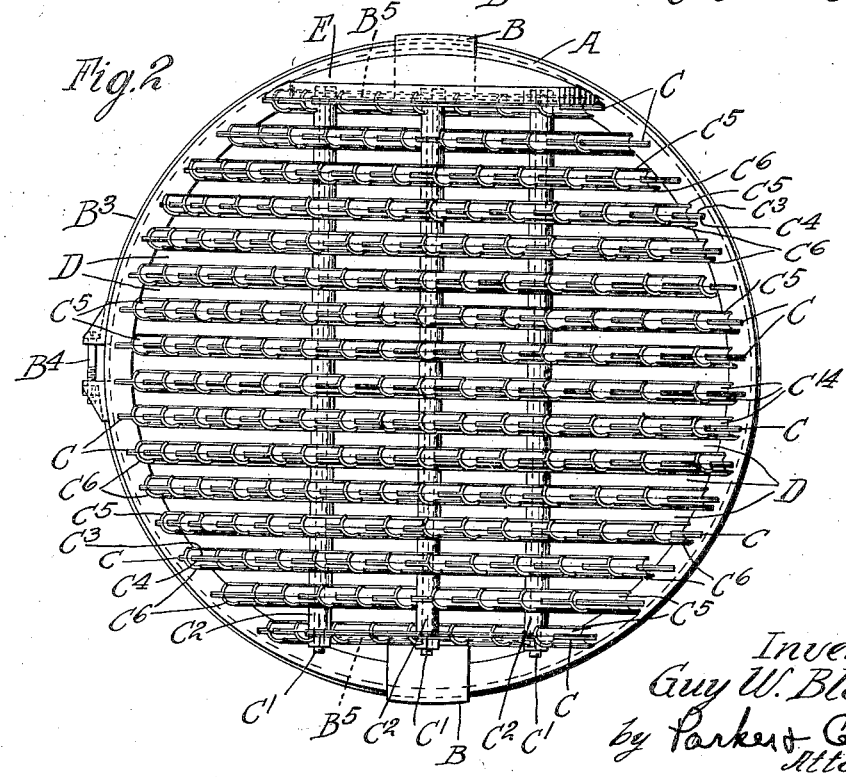
Inventor
Guy W. Blackburn
by Parker & Carter
Attorneys.

Nov. 13, 1928.
G. W. BLACKBURN
ANTIGLARE DEVICE
Filed Nov. 7, 1927
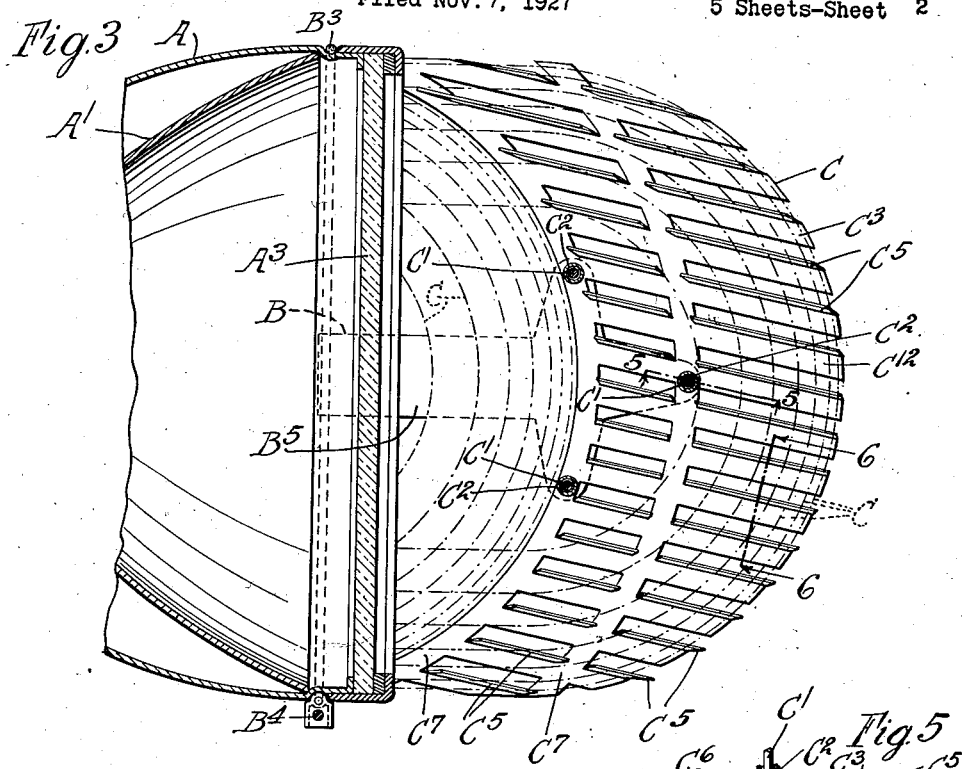
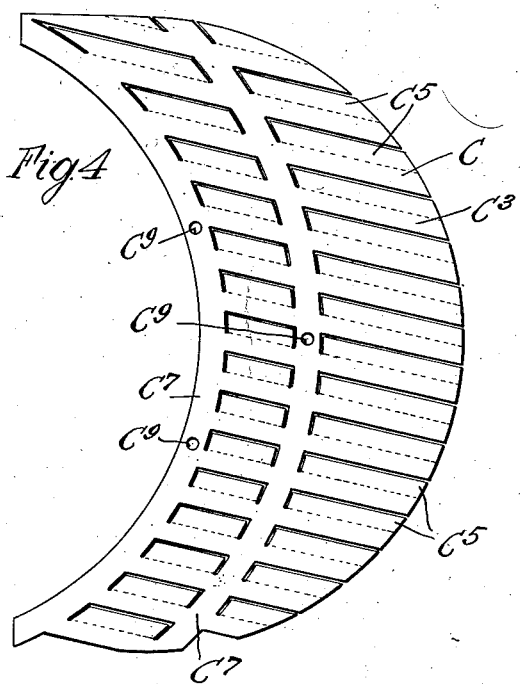
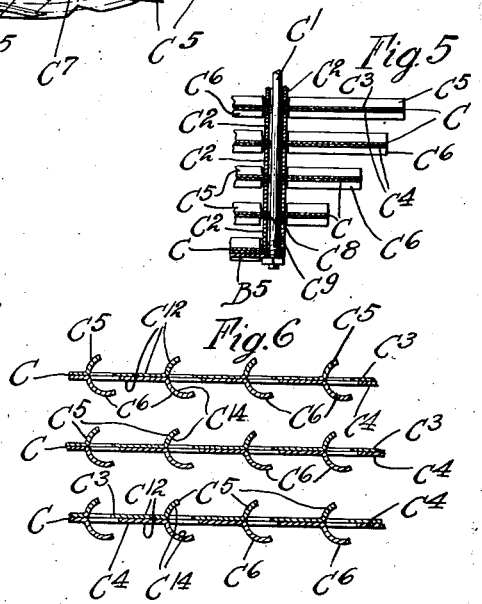
Inventor
Guy W. Blackburn
by Parker + Carter
Attorneys.

Nov. 13, 1928.  1,691,107
G. W. BLACKBURN
ANTIGLARE DEVICE
Filed Nov. 7, 1927   5 Sheets-Sheet 3
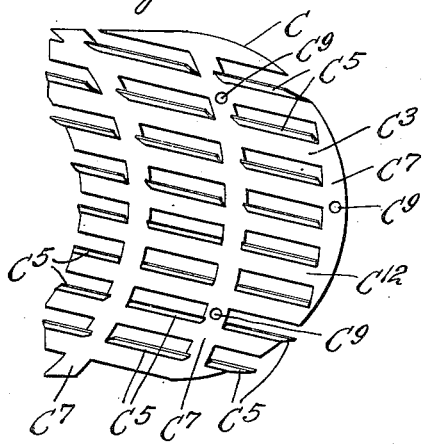
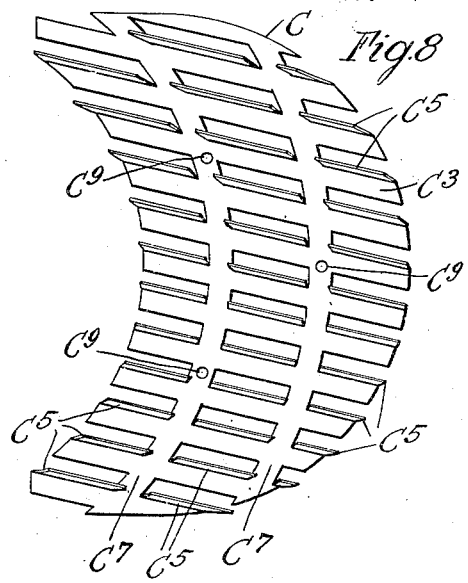
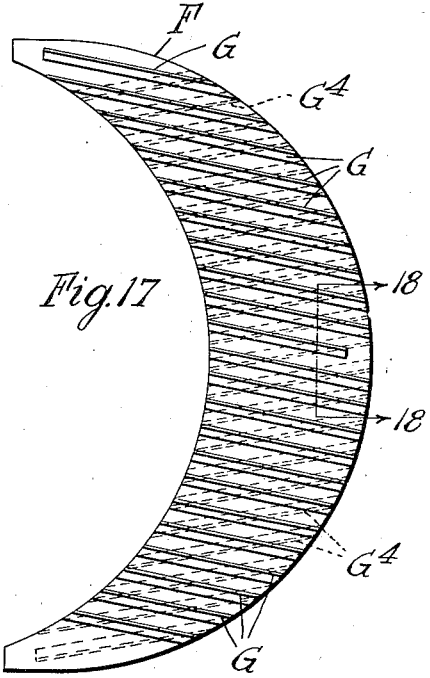
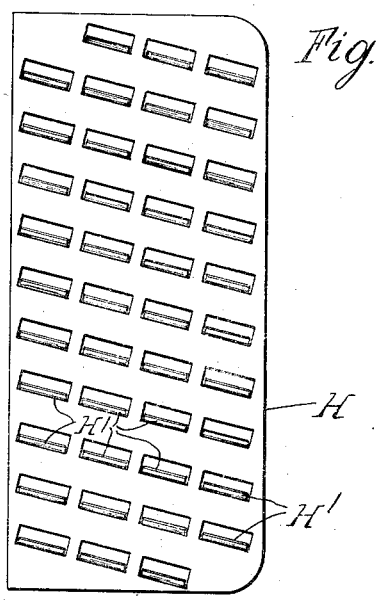
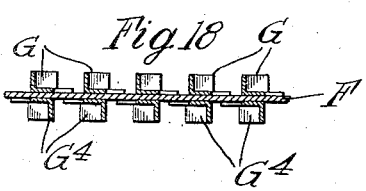
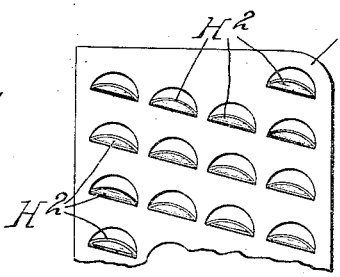
Inventor
Guy W. Blackburn
by Parker & Carter
Attorneys Nov. 13, 1928.
G. W. BLACKBURN
1,691,107
ANTIGLARE DEVICE
Filed Nov. 7, 1927  5 Sheets-Sheet 4
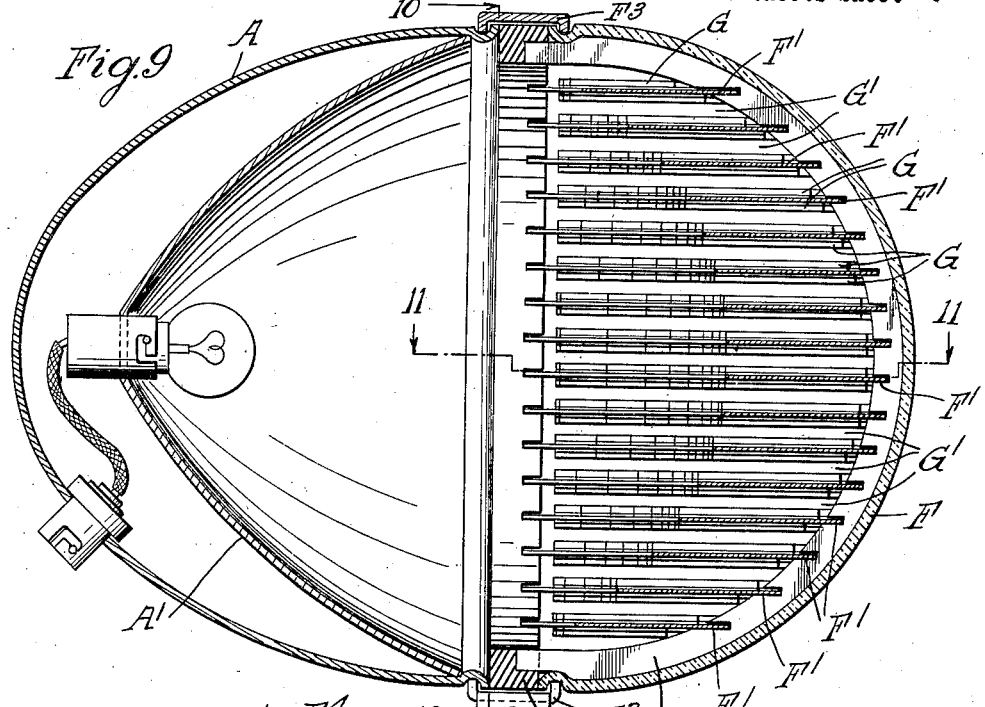
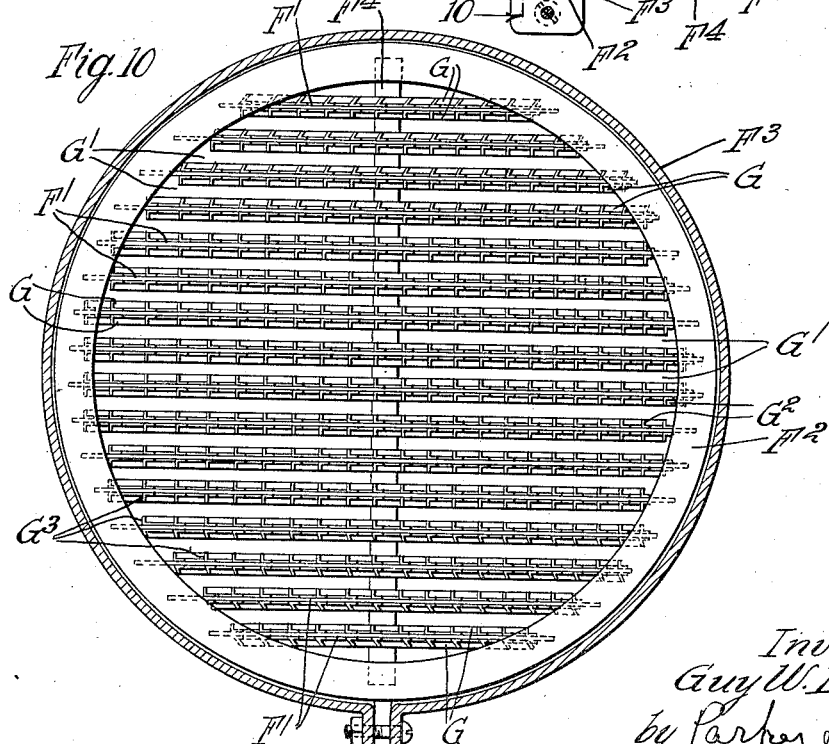
Inventor
Guy W. Blackburn
by Parker & Carter
Attorneys.

Nov. 13, 1928.
G. W. BLACKBURN
ANTIGLARE DEVICE
Filed Nov. 7, 1927
1,691,107
5 Sheets-Sheet 5
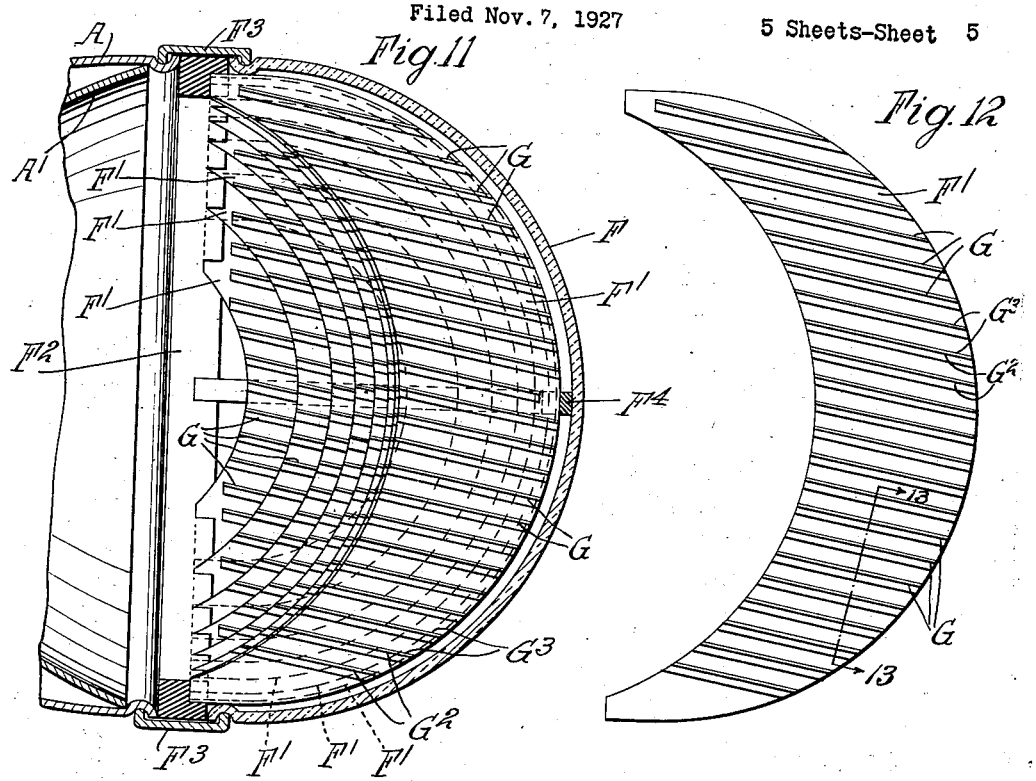
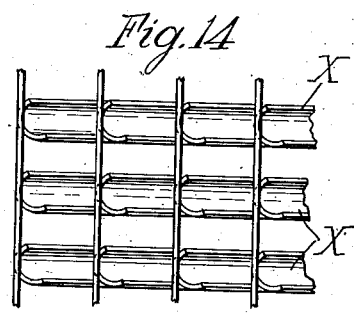
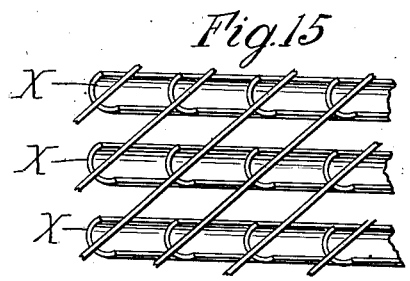
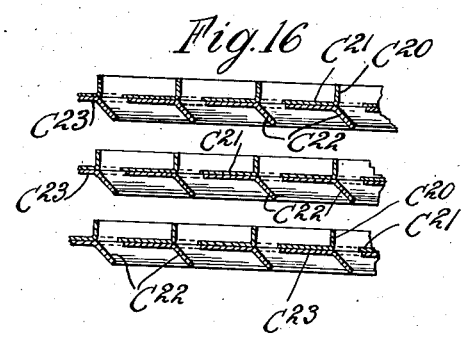
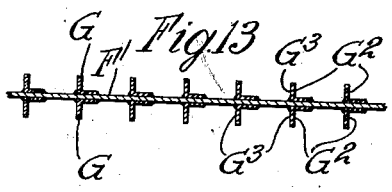
Inventor
Guy W. Blackburn
by Parker & Carter
Attorneys.

Patented Nov. 13, 1928.

1,691,107

UNITED STATES PATENT OFFICE.

GUY W. BLACKBURN, OF ELGIN, ILLINOIS.

ANTIGLARE DEVICE.

Application filed November 7, 1927. Serial No. 231,435.

My invention relates to improvements in antiglare devices for headlights, searchlights and the like, as used in automobiles, railroad headlights and the like of the general type disclosed in my co-pending application No. 188,188, filed on the 2nd day of May, 1927. One object is to provide an attachment for a headlight which will prevent the upward reflection or diffusion of the rays, above the horizontal axis of the light, whether direct from the light source or reflected from the reflector. Another object is to provide means, independent of the reflector or lens, for controlling the direction of the light. Another object is the provision of an effective field of illumination on the road itself and at the sides of the road.

Other objects will appear from time to time in the course of the specification and claims.

I illustrate my invention more or less diagrammatically in the accompanying drawings, wherein—

Figure 1 is a side elevation with parts in section;

Figure 2 is a front elevation;

Figure 3 is a section along the line 3—3 of Figure 1, showing part of the baffle plates in dotted lines;

Figure 4 is a plan view of the blank of one of the middle baffle plates shown in Figure 3;

Figure 5 is a fragmentary section along the line 5—5 Figure 3;

Figure 6 is an enlarged section along the line 6—6 of Figure 3;

Figure 7 is a plan view of the lower baffle plate;

Figure 8 is a plan view of one of the intermediate baffle plates;

Figure 9 is a vertical section of a variant form of deflector;

Figure 10 is a section along the line 10—10 of Figure 9;

Figure 11 is a longitudinal section along the line 11—11 of Figure 9;

Figure 12 is a plan view of one of the middle baffle plates;

Figure 13 is an enlarged vertical section along the line 13—13 of Figure 12;

Figure 14 is a diagrammatic view showing the baffle plates in a vertical position;

Figure 15 is a diagrammatic view illustrating the baffle plates in an inclined position;

Figure 16 is a fragmentary vertical section of a variant form of baffle plate;

Figure 17 is a plan view of a variant form of baffle plate showing the lower row of deflecting strips running in direction opposite to the upper row of strips;

Figure 18 is an enlarged section along the line 18—18 of Figure 17; and

Figures 19 and 20 are plan views of variant forms of baffle plates.

Like parts are indicated by like characters throughout the specification and drawings.

A is a lamp case or housing, $A^1$ a reflector therein, $A^2$ an incandescent bulb, and $A^3$ the lens closing the front of the housing, through which the light rays may be transmitted. This lens may be plain and adapted to permit the rays to pass directly through or it may be of any other suitable shape adapted to control or direct the light rays. $A^4$ is the rim or flare of the housing.

B, B, are brackets removably mounted on the rim of the housing, in any suitable manner, being herein illustrated as having one end of each bracket curved as at $B^1$ to conform to the groove $B^2$ of the housing A and held rigidly in position by a cable $B^3$ with clamping means $B^4$. Projecting forwardly from each bracket is an arm $B^5$ having a plurality of fingers upon which are mounted a series of baffle plates C projecting in front of the housing. These baffle plates are held in place by the vertical bolts $C^1$ with spacers $C^2$ between them to hold them in parallel spaced relation in front of the reflector.

As illustrated in Figures 3, 4, 7 and 8 the baffle plates are crescent shaped and of different sizes, the assembly being forwardly semi-spherical in shape. In the form shown in Figures 1 to 8 each baffle plate C consists of two individual plates $C^3$ $C^4$ which may be secured to each other in any suitable manner such as by soldering or welding, the upper plate $C^3$ having a plurality of upwardly and laterally inclined members $C^5$ the lower plate $C^4$ having a like number of downwardly and laterally inclined projections $C^6$, the cross-section of those projections being of any desired shape such as square or angular or arcuate. Referring in particular to Figure 6 the projections $C^5$ $C^6$ are shown as being arcuate in cross-section, the segment of the arc formed being tilted somewhat from the horizontal. I propose to form the baffle plates by means of dies using individual dies to cut out the different crescent shaped blanks, one master die for piercing and shaping the upwardly projecting inclined members $C^5$ in the upper portions $C^3$ of the individual baffle plates, and one master die for piercing and forming the downwardly protruding laterally inclined portions $C^6$ of the underneath plates $C^4$ of the baffle plates proper. The baffle plates C may have a plurality of connecting or holding portions $C^7$ which may be flat or may be dished to add strength as indicated by $C^8$ shown in Figure 5. $C^9$ are a plurality of apertures through which the bolts $C^1$ may pass. It is understood that in the baffle plates thus formed the connecting portions $C^7$ of all plates will have the same radius and will be in alignment with each other when assembled. The same is true of the arcuate portions $C^5$ $C^6$ as illustrated in Figure 6. Figure 4 shows a top plan view of one of the upper plates $C^3$ of the middle baffle plates C, the portions $C^5$ are illustrated as being pierced by the master die, before being bent in shape. The upper and lower surfaces of the baffle plates proper are preferably polished as indicated at $C^{12}$, the opposite surfaces of the plates $C^3$ $C^4$ may be made non-reflecting by any suitable means, said surfaces being exposed within the arcuate portions as at $C^{14}$. In most forms of my device this is unnecessary, since the form of the deflector members and plates is such as to direct the rays where desired, without the loss of light consequent upon the employment of light absorbing surfaces. Referring for example to Figure 6 it will be understood that under many circumstances it is preferable to so shape, space and proportion the deflector members, whether arcuate or otherwise, as to eliminate the presence of a flat surface, except along the lines of support $C^7$. In such case the length of the downturned and upturned metal lips will be equal, but I prefer to so proportion them as to expose an arc of greater lateral extension to the upwardly inclined rays than to the lower inclined rays, even though the stock used may be of the same length. I may obtain this result by a greater inclination of the upper members $C^5$, or the employment for them of an arc of longer radius.

The inclination of the laterally inclined members $C^5$ $C^6$ is such that the left hand corners of the inner row of arcuate members as illustrated in Figure 3 overlap the right hand corners of the outer row of arcuate members, thus shutting off any direct horizontal rays of light reflected by the lamp, except those passing through the open spaces D between the series of baffle plates C. It will be understood that although a portion of the directly horizontal rays will escape the reflecting means altogether, they will not be high enough to blind the oncoming motorist. Any rays which tend to incline upwardly into the face of the approaching motorist will meet one of the laterally inclined reflectors $C^5$ $C^6$ and will be reflected to the right or left, depending on whether the reflecting members $C^5$ $C^6$ are inclined to the right or left. It will be understood that by the positioning and proportioning and shaping of these members any desired direction may be given for any beam, but preferably the beams so reflected are thrown to the side of the road to give a field of illumination including the road itself and objects immediately to the side of the road. Any light rays deflected laterally by the polished surfaces of the arcuate portions will be thrown against the non-reflecting surfaces of the arcuate members and thus checked. The upper baffle plate is provided with a cover E to check any upwardly reflected rays through the open spaces of said baffle plate.

The supporting means for the previously described reflecting members may if desired be mounted horizontally as shown in Figure 14 or at an incline as illustrated in Figure 15. The positioning of the inclined horizontal deflecting members indicated as X is the important feature.

The field illuminated can be very closely determined by the location and inclination and shape of the deflecting members.

Referring to Figure 6 the light which tends to incline upwardly and strike against the lower portion of the arc, will in part be deflected laterally to the right and to the left. There will also be a fan of light thrown on the road and road side, this being one purpose of the rounded contour of the elements as a whole. The shaping of the arcuate members in Figure 6 makes it impossible for any light to be reflected from the horizontally inclined members upwardly along the central axis of the light. There will be some upward reflection, but it will be limited to reflection laterally inclined from the center line.

In the form shown in Figure 16 the reflecting members $C^{20}$ of the upper plate $C^{21}$ project upwardly at right angles to said plate and the reflecting members $C^{22}$ of the underneath plate $C^{23}$ are bent at an incline, thus forming angular reflecting surfaces.

Referring to the variant form shown in Figures 9 to 13 inclusive, the headlight housing has a forwardly convex translucent cover F which encloses and protects the baffle plates $F^1$. These plates are located entirely in front of the deflector bowl $A^1$, being supported at their rear edges in the notched fibre ring $F^2$ contained in the supporting metal band $F^3$ which surrounds the mouth of the reflector bowl and supports the cover F. The forward edges of the baffle plates $F^1$ are supported in the notched or slotted supporting segment F⁴, each plate being supported at three widely separated points and held permanently in place. Baffle plates of the class previously described may be used, but I have shown a variant form wherein the baffle plate F¹ of crescent shape is provided with series of upwardly and downwardly projecting strips G angular in form, which may be soldered to the plate, the angle of inclination of said deflecting strips being such that no directly horizontal rays will escape except through the open spaces G¹ formed by the evenly spaced baffle plates. The surfaces G² of the deflecting strip G, in the path of the reflected rays of the reflector bowl A¹, are polished, the opposite surfaces G³ being preferably made non-reflecting as by use of black paint. The baffle plates are so arranged that the distance the light rays must travel in passing between any pairs of plates is about the same. The reason for this is that experience shows that unless the plates are cut away so that the length of path between the plates is about the same for those rays thrown to the side as it is for those rays thrown to the front the side of the road will not be properly illuminated. It will be noted that the radius of the inner edge of the crescent shaped baffle plates is substantially the same as the radius of the outer edge.

Referring to Figure 17 I have shown a baffle plate adapted to be used when it is desired to throw an equal amount of light rays to the right and to the left, the plate F having a series of reflector strips G on one side, the angle of inclination being such as to throw the light rays to the right, the strips G⁴ on the opposite side of the baffle plate being so positioned as to deflect the light rays to the left.

In Figure 19 I have illustrated the baffle plate H as being rectangular in shape and as having a plurality of reflecting members H¹, said members being formed in any suitable shape from rectangular shaped pierced portions.

Figure 20 illustrates the baffle plate H having reflecting members formed out of semicircular pierced portions H².

It will be realized that whereas I have shown a practical and operative device, nevertheless many changes might be made in size, shape, number and disposition of parts without departing from the spirit of my invention. I therefore wish my drawings and description to be taken as in a broad sense illustrative and diagrammatic rather than as limiting me to my specific description and showing.

The use and operation of my invention are as follows:

I have herein described and shown a number of variant mechanisms for producing the desired effect. It will be understood from these that generally stated, my invention consists in positioning, in a plurality of horizontal planes, deflecting members which will prevent the upward inclination of the rays along the axis of the light, but which will permit both upward and downward deflection of the light rays to the side of the road. Instead of employing closed plates, I position a relatively large number of laterally inclined deflector members. They are so positioned and proportioned as to have the effect of closed plates, in that no rays will be permitted to escape upwardly through the series along the central axis of the light. In that sense they have the effect of a horizontal plate, in that the light passing through the horizontal open spaces between groups of members, can go directly forwardly without interference, while such beams as are inclined upwardly or downwardly inevitably strike and are deflected about the inclined deflecting or reflecting members.

Assuming that the members are formed to deflect to the right, being inclined from the right to the central axis of the light, it will be understood that although the direct horizontal rays will escape the reflecting means altogether, they will not be high enough to blind an oncoming motorist. Any rays tending to incline upwardly into the face of the approaching motorist will meet one of the inclined reflectors and will be reflected to the right, or, if the inclination of the members is reversed, to the left. It will be understood that by positioning and proportioning and shaping these members, any desired field of illumination may be obtained, and preferably the beams reflected are thrown to the side of the road to give a field which will cover the road itself, and objects immediately to the side of the road, both above and below the axis of the light.

It will be understood that the desired field of illumination, assuming that the light rays are laterally directed to one side of the road only, will include a fan of light at the side of the road, covering the roadside and also extending upwardly at a substantial angle, in order to illuminate buildings, trees, signs and the like, at the side of the road. The field of illumination of the road proper is so restricted that no rays will strike an onwardly approaching car so high as to reach the eyes of the driver. If the deflector members are formed to throw light laterally upon both sides of the road, then a similar fan-shaped field of illumination will be present at each side of the road, with the upwardly limited field of illumination on the road proper. The surface of the road will be included in the field and the lower portion of the approaching cars.

In connection with the claims it will be understood that the use of the term "deflector members" is limited to the particular members described and shown in the drawings.

For example I may obtain a kindred, although in general less efficient effect by employing solid plates and corrugating them to conform so far as possible to the shape and location of deflector members herein shown.

I claim:

1. In an anti-glare device for a lamp, a plurality of superposed groups of deflector members, each such group including a plurality of forwardly extending deflector members arranged in a like horizontal plane, the deflector members in each such group being laterally inclined to the main axis of the lamp.

2. In an anti-glare device for a lamp, a plurality of superposed groups of deflector members, each such group including a plurality of members arranged in a like horizontal plane, the deflector members in each such group being laterally inclined, in the same direction, to the main axis of the lamp.

3. In an anti-glare device for a lamp, a plurality of superposed groups of deflector members, each such group including a plurality of members arranged in a like horizontal plane, the deflector members in each such group being inclined to the main axis of the lamp, the deflector members of each group being so shaped, spaced and positioned as to prevent the upward or downward inclination, through such group, of light rays forwardly projected from the lamp, along paths generally parallel with the axis of the lamp.

4. In an anti-glare device for a lamp, a plurality of deflector members forwardly extending from the lamp, said members being arranged in vertically aligned groups, the members in each such group lying in a generally horizontal plane and being laterally inclined in relation to the central axis of the lamp, the members being adapted, by spacing and inclination, to prevent rays from the lamp from inclining upwardly through the plane of the various groups along the central axis of the lamp, or in parallelism with it, while permitting a substantial measure of upward and downward inclination of such rays through the planes of the various groups along directions laterally substantially inclined from the central axis of the lamp.

5. In an anti-glare device for a lamp, a plurality of superposed groups of deflector members, each such group including a plurality of members arranged in a like horizontal plane, the deflector members in each such group being inclined in the same direction to the main axis of the lamp, the deflector members being arcuate in cross section.

6. In an anti-glare device, for a lamp, a plurality of superposed groups of deflector members, each such group being arranged in a horizontal plane, each such group including a plurality of longitudinally extended deflectors laterally inclined across the main axis of the lamp, connecting and supporting members connecting the deflector members of the individual groups, and spacing and securing means for positioning said groups in relation to each other.

7. In an anti-glare device for a lamp, a plurality of superposed groups of deflector members, the members of each group being arranged in a horizontal plane, each such group including a plurality of longitudinally extended deflectors laterally inclined across the main axis of the lamp, each such group including a pair of opposed plates having deflector members upset therefrom, a portion of each such deflector member projecting upwardly from the upper plate of each pair and another portion of each said deflector member projecting downwardly from the lower plate.

8. In an anti-glare device for a lamp, a plurality of superposed groups of deflector members, the members of each group being arranged in a horizontal plane, each such group including a plurality of longitudinally extended deflectors laterally inclined to the main axis of the lamp, each such group being generally crescent-shaped, the assembly formed thereby being forwardly hemispherical.

Signed at Chicago, county of Cook and State of Illinois, this 5th day of November, 1927.

GUY W. BLACKBURN.